United States Patent Office 3,574,849
Patented Apr. 13, 1971

3,574,849
BIS-(p-CHLOROPHENOXY)ACETIC ACID IN COMPOSITIONS AND METHODS FOR TREATING HYPERCHOLESTEREMIA
Rudolf G. Griot, Florham Park, N.J., assignor to Sandoz-Wander, Inc., Hanover, N.J.
No Drawing. Continuation-in-part of application Ser. No. 560,874, June 27, 1966. This application Nov. 13, 1967, Ser. No. 682,647
Int. Cl. A61k 27/00
U.S. Cl. 424—317                          12 Claims

ABSTRACT OF THE DISCLOSURE

This disclosure relates to derivatives of acetic acid, e.g., bis-(p-chlorophenoxy)acetic acid isopropyl ester. These compounds are useful as hypocholesteremics/hypolipemics.

---

This application is a continuation-in-part of application Ser. No. 560,874, filed June 27, 1966, now abandoned.

This invention relates to derivatives of acetic acid. In particular, the invention pertains to bis-(aryloxy)acetic acids and alkyl esters thereof which possess hypocholesteremic/hypolipemic activity. The invention further relates to pharmaceutical compositions containing the above compounds as an active ingredient thereof and the use of such compositions for the treatment of hypercholesteremia/hyperlipemia.

The compounds contemplated by the present invention are of the structural formula

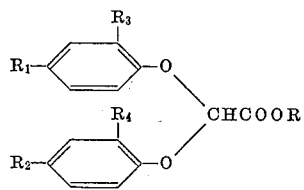

wherein R represents H; or lower alkyl, straight or branched chain and preferably containing from 1 to 6 carbon atoms, e.g., methyl, ethyl, propyl, isopropyl, butyl, t-butyl, pentyl and hexyl; and each of $R_1$, $R_2$, $R_3$ and $R_4$, independently, represents H, chloro, bromo, or iodo; provided at least one of $R_1$ and $R_2$ is other than H.

The preferred compounds of Formula I are those wherein both $R_1$ and $R_2$ are other than H.

Those compounds of Formula I are known wherein R is H, methyl or ethyl and either where
(1) $R_1$ and $R_2$ are each chloro and $R_3$ and $R_4$ are H; or
(2) $R_1$, $R_2$, $R_3$ and $R_4$ are each chloro.

(Chem. Abs. 61, 1793 g.). The present invention only contemplates the novel use of such compounds particularly as hypocholesteremic/hypolipemic agents. The other compounds encompassed by Formula I are new and also possess marked and unexpected hypocholesteremic/hypolipemic activity.

The compounds of Formula I may be prepared according to several processes. These processes may be classified generally into two different categories, namely, (1) those which permit the obtaining of bis-substituted phenoxy acetic acids and corresponding esters wherein the substituents are the same on each of the two aromatic nuclei, (i.e., $R_1=R_2$, $R_3=R_4$) and (2) those whereby there may be obtained compounds with phenoxy groups having more than two different substituents thereon. Some of the processes fit into both categories. Various processes useful in preparation of the acetic acids and corresponding esters of Formula I are set out in the reaction flow chart below. As will be seen from the chart, processes F, G, J, K and L all provide the compounds of Formula I where R is loweralkyl, whereas processes G, J, K and L provide the free acids of Formula I. Processes A through F, inclusive, may be used to provide bis-substituted phenoxy acetic acids having more than two different types of substituents on the aromatic nuclei.

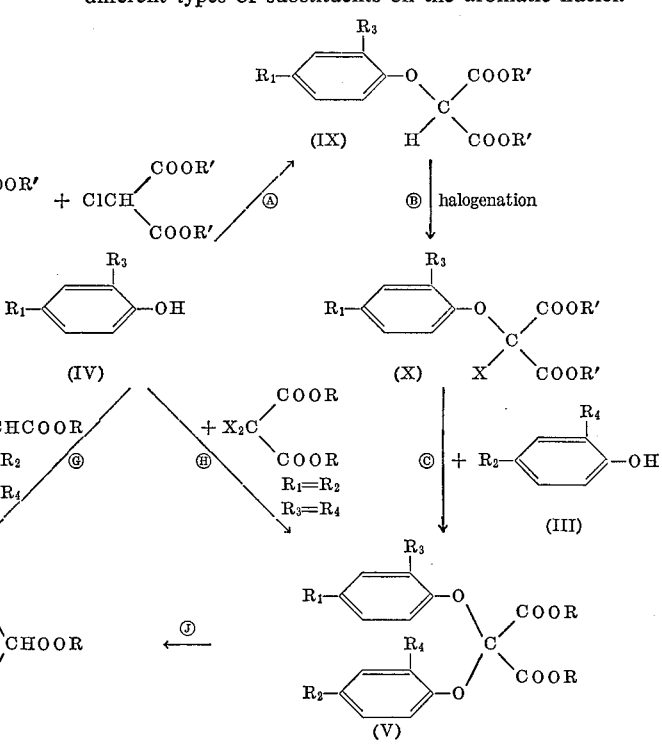

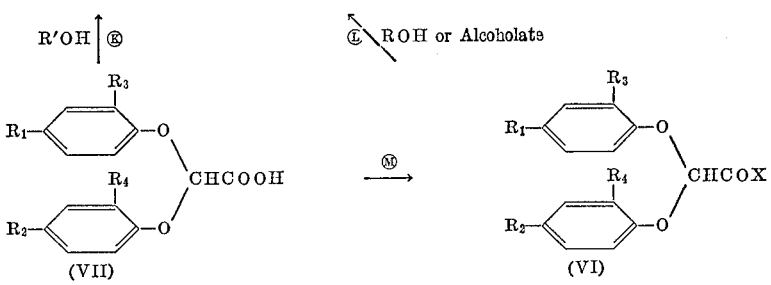

R, $R_1$, $R_2$, $R_3$ and $R_4$ are as defined above, $R_2$ represents lower alkyl, and X represents halo, preferably chloro or bromo.

Method F pertains to the reaction of a substituted phenoxy halo acetic acid ester (II) and an appropriately substituted phenol (III) as the phenolate. This reaction is conveniently effected in a suitable inert organic solvent such as dimethylacetamide; diethylacetamide; dimethylformamide; and tetramethylurea. Preferably, the reaction is initially carried out at room temperature and then allowed to continue at elevated temperatures up to about 80° C. The particular solvent employed is not critical, nor is the temperature employed critical provided it does not exceed about 80° C. The resulting acetic acid ester (I) is readily recovered employing conventional techniques. The substituted phenol (III) is readily converted to the phenolate using standard techniques, such as treating the phenol with either a strong alkali metal hydroxide, e.g., KOH or NaOH, and water or sodium hydride in dimethylacetamide.

Method G involves the reaction of the substituted phenol (IV) as a phenolate and a dihalocarboxylic acid ester or free acid and the solvents and temperatures which may be used are substantially as discussed with respect to method F.

The process above identified as method J is conducted by treating an appropriately substituted malonic acid ester or free acid (V) with an alcohol or alcoholate desirably in a suitable inert organic solvent, e.g., benzene, toluene and xylene, and in the presence of an alkali metal alkoxide, such as sodium methoxide and sodium ethoxide. The reaction is conveniently carried out at an elevated temperature, preferably the reflux temperature of the system. The resulting product (I) is readily recovered in a conventional manner.

Alternatively, the compounds of Formula I may be prepared according to process L above by reacting an appropriate bis-(substituted phenoxy) acetyl halide (VI), such as the acetyl chloride, with an appropriate alcohol or alcoholate. The preparation of the acetyl chloride (method M) and subsequent reaction thereof with alcohols are performed according to methods described in the literature. When an alcoholate is used instead of the free alcohol, it is generally preferred to carry out the reaction in a suitable inert organic solvent such as absolute diethyl ether. Such reaction is highly exothermic, and it is desirable to maintain the reaction temperature at about 20°–30° C. This procedure utilizing an alcoholate is particularly suitable for the preparation of those compounds of Formula I wherein R is a tertiary loweralkyl, e.g., t-butyl and t-pentyl.

The compound of Formula I may also be prepared according to process K above. This simple esterification may be carried out by treating the substituted bis-phenoxyacetic acids (VII) with an appropriate alcohol in a conventional manner. The esterification may be conducted at room temperature or at elevated temperatures. Preferably, it is conducted at reflux temperature and in the presence of a catalytic amount of hydrogen ions such as may be supplied by the use of an arylsulfonic acid, e.g., benzenesulfonic acid, p-toluenesulfonic acid and the like. The use of a solvent is not necessary since an excess of alcohol may be used for that purpose. The resulting product (I) is readily recovered in a conventional manner.

The substituted phenoxy haloacetic acid ester starting materials (II) used for process F described above may be prepared as indicated according to processes D and E. Method D concerns treatment of the phenolate of compound (IV) with a monohaloacetic acid, e.g., chloroacetic acid, to obtain the substituted phenoxy acetic acid of Formula VIII. The same solvents and reaction conditions discussed respecting processes F and G apply here as well. The compounds of Formula VIII are then halogenated to provide the compounds of Formula II (method E). Conventional halogenating agents may be employed. The preferred agent is bromine or chlorine although other agents such as N-bromosuccinimide or sulfuryl chloride can also be used. The halogenation is conveniently carried out in a suitable inert organic solvent such as a halocarbon, for instance a chloroalkane, e.g., dichloromethane, chloroform, carbontetrachloride, and the like. Preferably, the reaction is initially carried out at room temperature and then allowed to continue at reflux temperature. However, neither the choice of solvent nor the temperature used is critical.

The starting compounds of Formula V which are utilized in method J, discussed above, may be prepared by treating the phenolate of the compound of Formula IV with dihalomalonic acid esters under the same conditions and with the same solvents as described for the reaction of the dihaloacetic acid esters utilized in process G. The bis-(substituted phenoxy)malonic acid esters of Formula V are also prepared by treating phenolate of the compounds of Formula IV with a chloromalonic acid ester to provide the corresponding substituted malonic acid ester derivative (IX) (method A). The temperature and solvents used for method F may be utilized. The compounds of Formula IX are then halogenated (method B) in a manner as earlier discussed with respect to process E, and the resulting substituted phenoxy halomalonic acid ester (X) is treated with a phenolate of the compounds of Formula III (process C) to provide starting compounds (V) which is loweralkyl or utilizing the solvents and reaction conditions indicated hereinabove for process F.

Various of the phenolates and acetic acid and malonic acid derivatives employed as reactants above are known and are prepared according to methods disclosed in the literature. Those others not specifically described in the literature are prepared by analogous methods from known materials.

It should be understood that in each of processes G, H and J, it is preferred that R represent lower alkyl since use of the free acid tends to lower the yield of product (I).

As previously indicated, the compounds of Formula I are useful because they possess pharmacological properties in animals. In particular these compounds are useful as hypochloesteremics/hypolipemics, as indicated by their activity in sodium hexobarbital anesthetized rat tested by extracting serum or plasma with isopropanol and noting the cholesterol content. For such usage, the compounds may be administered orally as such or admixed with conventional pharmaceutical carriers or administered orally in such forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin.

The compounds of Formula I where R=H may also be utilized as hypocholesteremics/hypolipemics in the form of non-toxic pharmaceutically acceptable salts thereof. As illustrative of such salts there may be included aluminum salt; non-toxic alkali metal salts, e.g., potassium and sodium salts; non-toxic alkaline earth metal salts, e.g., magnesium and calcium salts; salts with N-containing bases such as ammonium salts and pharmaceutically acceptable primary, secondary and tertiary amine salts, e.g., ethanol amine salts, diethanol amine salts, and the like.

The dosage of active ingredient employed for the alleviation of hyperlimpemia (hypercholesteremia) may vary depending on the particular compound employed and the severity of the condition being treated. In general, satisfactory results are obtained when these compounds are administered at a daily dosage of from about .5 milligrams to about 50 milligrams per kilogram of animal body weight. This daily dosage is preferably given in divided doses and administered 2-4 times a day, or in sustained release form. For most large mammals, the total daily dosage is from about 50-2000 mg. and dosage forms suitable for internal use comprise from about 12.5 milligrams to about 500 milligrams of active compound in intimate admixture with a solid or liquid pharmaceutically acceptable carrier or diluent. The preferred pharmaceutical compositions from the standpoint of preparation and ease of administration are solid compositions, particularly hard-filled capsules and tablets containing from 25 milligrams to about 250 milligrams of the active ingredient.

The following examples serve to further illustrate the present invention. However, it is to be understood that the examples are for purposes of illustration only and are not intended as in any way limiting the scope of the invention which is defined in the appended claims. Furthermore, it is to be understood that the active ingredient used in Examples 6 and 7 can be replaced by any of the other known or novel compounds described hereinabove and there are likewise obtained pharmaceutical compositions suitable for the treatment of hyperlipemia.

EXAMPLE 1

Bis-(p-chlorophenoxy)acetic acid isopropyl ester

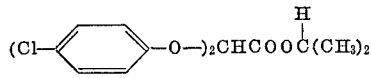

Bis-(p-chlorophenoxy)acetic acid, 40 gm., is refluxed for 14 hours in 400 ml. of isopropanol containing 1.0 gm. of p-toluenesulfonic acid. The mixture is then cooled to about 60° C. and 3 gm. of potassium carbonate is added. The resulting mixture is then evaporated in vacuo, and the residue dissolved in 300 ml. of benzene. The benzene solution is washed first with 100 ml. of water and then with 100 ml. of 10% aqueous sodium carbonate solution. The benzene is then evaporated in vacuo, and the resulting crude product recrystallized from 150 ml. of isopropanol and washed with ice-cold petroleum ether to yield bis-(p-chlorophenoxy) acetic acid isopropyl ester, M.P. 73.5–75° C.

EXAMPLE 2

Bis-(p-chlorophenoxy)acetic acid t-butyl ester

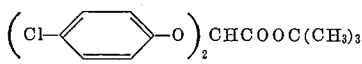

To a solution of 11.135 gm. of potassium t-butylate in 85 ml. of t-butanol is added with stirring, while maintaining the reaction temperature between 20° to 30° C., a solution of 33.2 gm. of bis-(p-chlorophenoxy)acetyl chloride in 50 ml. of absolute diethyl ether. After the addition is completed, the mixture is stirred for an additional 10 minutes and then evaporated in vacuo to dryness. To the residue is added 200 ml. of chloroform, 100 ml. of ice water and 100 ml. of saturated sodium bicarbonate solution. The organic phase is then separated, washed with 75 ml. of water, dried over magnesium sulfate and evaporated. The crude product thus obtained is recrystallized from cyclohexane and washed with ice-cold petroleum ether to yield bis(p-chlorophenoxy)acetic acid t-butyl ester, M.P. 92° C.

EXAMPLE 3

(p-Bromophenoxy)-(2,4-dichlorophenoxy)acetic acid methyl ester

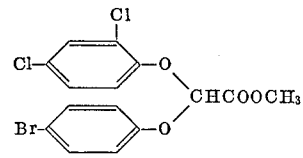

Step. 1. (p-Bromophenoxy)-acetic acid methyl ester

Sodium hydride (56.7% in mineral oil) (47 g.) is washed free from the mineral oil with low boiling petroleum ether and suspended in 750 ml. of dimethylacetamide. To the suspension is added 130 g. of p-bromophenol in 500 ml. of dimethylacetamide as the temperature is maintained at 10–20° C. The mixture is stirred for two hours and methyl chloro acetate is added. The resulting mixture is stirred for five hours at 80° C. and then at room temperature for 72 hours. The resulting mixture is then poured over 2 liters of ice water, extracted with 750 ml. of isopropyl ether. The organic layer is separated, extracted with cold 1 N sodium hydroxide, dried over anhydrous sodium sulfate, filtered and evaporated to provide (p-bromophenoxy)-acetic acid methyl ester.

Step 2. α-bromo-p-bromophenoxy acetic acid methyl ester

To 1 liter of carbon tetrachloride is added 180 g. of (p-bromophenoxy)acetic acid methyl ester. With stirring at room temperature bromine (160 g.) is added dropwise and the mixture is stirred for 17 hours at room temperature. The mixture is washed with 1500 ml. of water and then 500 ml. of cold 10% aqueous sodium bicarbonate. The organic layer is separated, dried over anhydrous sodium sulfate and evapoarted to provide α-bromo-p-bromophenoxy acetic acid methyl ester.

Step 3. (p-bromphenoxy)-(2,4-dichlorophenoxy) acetic methyl ester

To 200 ml. of dimethylacetamide is added 15 g. of 2,4-dichlorophenol and the resulting mixture is added dropwise, with stirring, to a suspension of 4.6 g. of 56.7% sodium hydride (which had been washed free of mineral oil with petroleum ether) in 100 ml. of dimethylacetamide. The resulting mixture is stirred at room temperature for 90 minutes and 26 g. of α-bromo-p-bromophenoxy acetic acid methyl ester in 50 ml. of dimethylacetamide is added in several portions. The mixture is stirred at room temperaature for 72 hours, then at 50° C. for 30 minutes, poured over 1500 ml. of ice water and extracted with 500 ml. of isopropylether. The ether layer is extracted with 100 ml. of cold 1 N sodium hydroxide, dried over anhydrous sodium sulfate, filtered and evaporated to yield p-bromophenoxy)-(2,4-dichlorophenoxy)acetic acid methyl ester.

EXAMPLE 4

Bis(p-chlorophenoxy)acetic acid methyl ester

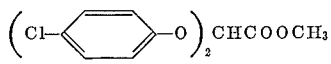

When the procedure of Example 1 is repeated using methanol in place of isopropanol, bis(p-chlorophenoxy) acetic acid methyl ester results. When this procedure is repeated using different substituted acetic acids in place of bis(p-chlorophenoxy)acetic acid, the following results are obtained:

| Starting compound | Product |
| --- | --- |
| Bis(p-iodophenoxy)acetic acid | Bis(p-iodophenoxy)acetic acid methyl ester (M.P. 105° C.). |
| Bis(p-bromophenoxy)acetic acid | Bis(p-bromophenoxy)acetic acid methyl ester (M.P. 75.5°-80.5° C.). |

EXAMPLE 5

Bis(p-bromophenoxy)acetic acid

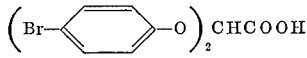

When the procedure of Example 3, Step 1, is used and dichloroacetic acid is used in place of methylchloroacetate, there is obtained bis(p-bromophenoxy)acetic acid.

EXAMPLE 6

Tablets

Tablets suitable for oral administration and containing the following ingredients are prepared by conventional tabletting techniques.

Ingredient:                                   Weight (mg.)
   Bis-(p - chlorophenoxy)acetic acid methyl
     ester _____  250
   Tragacanth _____  10
   Lactose _____  197.5
   Corn starch _____   25
   Talcum _____   15
   Magnesium stearate _____   2.5

The tablets so prepared are useful in the treatment of hypercholesteremia at a dose of one tablet, 2 to 4 times a day.

EXAMPLE 7

Dry filled capsules

Capsules suitable for oral administration containing the following ingredients are prepared in conventional manner.

Ingredient:                                   Weight (mg.)
   Bis-(p-chlorophenoxy)acetic acid ethyl ester __ 250
   Inert solid diluent (starch, lactose, or kaolin) __ 250

The capsules so prepared are useful in the treatment of hypercholesteremia at a dose of one capsule, 2 to 4 times a day.

What is claimed is:

1. A solid orally administrable pharmaceutical composition suitable for use in the alleviation of hypercholesteremia in mammals comprising as an active ingredient thereof a compound which is an acid of the formula

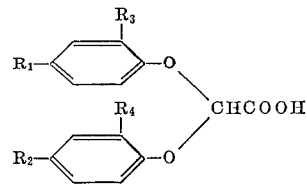

wherein
   each of $R_1$, $R_2$, $R_3$ and $R_4$, independently, represents a hydrogen atom, chloro, bromo or iodo,
   provided that each of $R_1$ and $R_2$ is other than a hydrogen atom, or a pharmaceutically acceptable salt thereof;
   and a solid orally administrable pharmaceutical carrier;
said compound being present in said composition in an amount sufficient to provide a daily dosage of from about 50 milligrams to about 2000 milligrams of said compound.

2. A composition of claim 1 wherein both $R_3$ and $R_4$ are hydrogen atoms; $R_1$ and $R_2$ and the proviso being as defined in claim 1.

3. A solid orally administrable pharmaceutical composition suitable for use in the alleviation of hypercholesteremia in mammals comprising as an active ingredient thereof a compound which is an acid of the formula

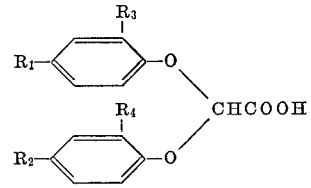

wherein
   each of $R_1$, $R_2$, $R_3$ and $R_4$, independently, represents a hydrogen atom, chloro, bromo or iodo,
   provided that each of $R_1$ and $R_2$ is other than a hydrogen atom, or a pharmaceutically acceptable salt thereof;
   and a solid orally administrable pharmaceutical carrier;
said compound being present in an amount of from about 12.5 milligrams to about 500 milligrams per unit dose of said composition.

4. A composition of claim 3 wherein both $R_3$ and $R_4$ are hydrogen atoms; $R_1$ and $R_2$ and the proviso being as defined in claim 3.

5. A method for the ellevation of hypercholesteremia in a mammal which comprises orally administering to said mammal an effective amount of a compound which is an acid of the formula

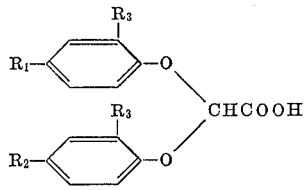

wherein
   each of $R_1$, $R_2$, $R_3$ and $R_4$, independently, represents a hydrogen atom, chloro, bromo or iodo.
   provided that each of $R_1$ and $R_2$ is other than a hydrogen atom, or a pharmaceutically acceptable salt thereof.

6. A method of claim 5 wherein both $R_3$ and $R_4$ are hydrogen atoms; $R_1$ and $R_2$ and the proviso being as defined in claim 5.

7. A method for the alleviation of hypercholesteremia in a mammal which comprises orally administering to said mammal a compound which is an acid of the formula

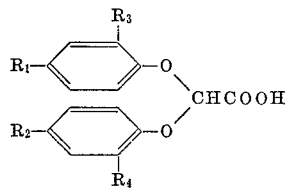

wherein
each of $R_1$, $R_2$, $R_3$ and $R_0$, independently, represents a hydrogen atom, chloro, bromo or iodo,
provided that each of $R_1$ and $R_2$ is other than a hydrogen atom, or a pharmaceutically acceptable salt thereof,
in an amount sufficient to provide a daily dose of from about 50 milligrams to about 2000 milligrams of said compound.

8. A method of claim 7 wherein both $R_3$ and $R_4$ are hydrogen atoms; $R_1$ and $R_2$ and the proviso being as defined in claim 7.

9. A composition of claim 4 wherein the active ingredient is bis-(p-chlorophenoxy) acetic acid.

10. A composition of claim 4 wherein the active ingredient is an aluminum salt of bis-(p-chlorophenoxy) acetic acid.

11. A method of claim 5 wherein the compound is bis-(p-chlorophenoxy) acetic acid.

12. A method of claim 5 wherein the compound is an aluminum salt of bis-(p-chlorophenoxy) acetic acid.

References Cited

UNITED STATES PATENTS

| | | | |
|---|---|---|---|
| 2,437,527 | 3/1948 | Hester et al. | 424—317 |
| 3,057,777 | 10/1962 | Van Heyningen | 424—317 |

OTHER REFERENCES

Chem. Abst. (I), vol. 61, p. 1793G (1964).
Chem. Abst. (II), vol. 45, p. 10462G (1951).
Chem. Abst. (III), Subj. Index, vol. 45, p. 11,252 (1951).
Chem. Abst. (IV), vol. 49, p. 7137b (1955).

STANLEY J. FRIEDMAN, Primary Examiner

U.S. Cl. X.R.

4224—308